United States Patent [19]

Mathews et al.

[11] Patent Number: 5,225,974
[45] Date of Patent: Jul. 6, 1993

[54] PROGRAMMABLE CONTROLLER PROCESSOR WITH AN INTELLIGENT FUNCTIONAL MODULE INTERFACE

[75] Inventors: Kathleen B. Mathews, Chesterland; Wayne C. Van Sickle, South Euclid; Donald A. Westman, Mentor; Ronald E. Schultz, Solon, all of Ohio

[73] Assignee: Allen-Bradley Company, Inc., Milwaukee, Wis.

[21] Appl. No.: 605,891

[22] Filed: Oct. 30, 1990

[51] Int. Cl.$^5$ .......................... G06F 9/06; G06F 13/10
[52] U.S. Cl. .................................. 364/140; 364/136;
  364/DIG. 2; 364/926.9; 364/949; 364/947.4;
  395/275; 395/425
[58] Field of Search ................................ 364/140-147,
  364/136, DIG. 1 MS File, DIG. 2 MS File;
  395/275, 325, 425

[56] References Cited

U.S. PATENT DOCUMENTS

| | | | |
|---|---|---|---|
| 3,942,158 | 3/1976 | Dummermuth | 340/172.5 |
| 4,404,651 | 9/1983 | Grudowski | 364/900 |
| 4,413,319 | 11/1983 | Schultz et al. | 364/200 |
| 4,516,202 | 5/1985 | Kadowaki | 364/400 X |
| 4,688,191 | 8/1987 | Conners | 395/425 X |
| 4,691,296 | 9/1987 | Struger | 364/900 |
| 4,882,702 | 11/1989 | Struger et al. | 364/900 |
| 4,912,623 | 3/1990 | Rantala et al. | 364/136 |
| 4,918,589 | 4/1990 | Floro et al. | 364/132 |
| 5,063,536 | 11/1991 | Tinder et al. | 395/775 |
| 5,089,984 | 2/1992 | Struger et al. | 395/650 |

FOREIGN PATENT DOCUMENTS

| | | |
|---|---|---|
| 0022622 | 1/1981 | European Pat. Off. |
| 1491159 | 5/1975 | United Kingdom |
| 2030323 | 9/1979 | United Kingdom |
| 2122387 | 6/1983 | United Kingdom |

Primary Examiner—Joseph Ruggiero
Attorney, Agent, or Firm—Quarles & Brady

[57] ABSTRACT

A programmable controller has a rack that houses and electrically connects a number of I/O modules and a processor module. The processor module includes a external communication network interface, a system memory, a processor section which executes a user-defined control program and a I/O interface that handles the exchange of data with the other modules. The I/O interface has circuitry for pre-processing data from defined input modules, thereby relieving the processing section of certain tasks. The shared memory contains information defining the input module from which to obtain data for pre-processing and the bits of that data to be examined for specified logic level transitions. The stored information also designates the frequency at which the data is to be read from the defined input module and how many occurrences of the specified logic level transitions must take place before the I/O interface signals the processor section that the pre-processing is complete.

22 Claims, 6 Drawing Sheets

FIG. 3
SHARED SYSTEM RAM

FIG. 5
PII CONFIGURATION DATA BLOCK

FIG. 9
PII RESULT COMMAND BLOCK

PROGRAMMABLE CONTROLLER PROCESSOR WITH AN INTELLIGENT FUNCTIONAL MODULE INTERFACE

The present invention relates to programmable controllers for operating industrial equipment, and more specifically to the processors in such programmable controllers which interface to a series of functional modules via a set of buses.

BACKGROUND OF THE INVENTION

Programmable controllers are a common type of industrial computer for operating a variety of manufacturing equipment, such as assembly lines and machine tools, in accordance with a stored control program. The program comprises a series of process control instructions which are read out and executed to examine the condition of selected sensing devices on the controlled equipment, and to energize or deenergize selected operating devices contingent upon the status of one or more of the examined sensing devices.

The state of many sensing and operating devices can be represented by a single bit of data which is manipulated by the control program instructions. Other devices, such as position sensors, provide multiple bits of data representing a condition of the equipment being controlled. For these latter devices, instructions are provided to manipulate bytes and words of data representing the state of the sensing and operating devices. Additional program instructions perform arithmetic operations, timing and counting functions, and complex statistical reporting operations. Such instructions have become quite standardized in the industry and ar directly associated with the elements of a ladder logic diagram which is easily understood by process control engineers. Program panels such as those described in U.S. Pat. Nos. 3,808,612; 3,813,649 and 4,070,702 have been developed to assist the user in developing and editing ladder logic control programs comprised of such programmable controller instructions.

The Allen-Bradley 1771 series programmable controllers are an example of this type of industrial computer. A 1771 programmable controller includes a rack having a number of slots which hold different kinds of functional modules. One slot holds a processor module that stores and executes the user-defined control program. The control program is executed repeatedly thereby performing the same logical operations over and over again for different workpieces being processed by the controlled equipment. Input and output modules, which electrically interface to sensing and operating devices on the controlled equipment, are positioned in other rack slots. The rack has an backplane with conductors to which the modules electrically couple, thereby enabling the exchange of data and control signals. For example, the processor module gathers data from the input modules representing the status of the sensing devices, and issues control commands to the output modules to which the operating devices are connected. The data is gathered and the commands are issued by the processor module over the rack backplane.

Many applications of programmable controllers require relatively high speed processing of input and output data. One example of such processing involves counting inputs for tracking the production of items, such as counting containers passing along a food canning line. In another example, a need may exist to respond immediately to a given input signal by taking the appropriate action, such as quickly clamping a workpiece when its presence is detected. These events may occur more frequently than once every execution cycle through a ladder logic program, occurring while another task is being performed. Therefore, its is desirable to provide a processor module with the capability to monitor selected inputs and perform simple logical operations without requiring processing time of a microprocessor in the module.

SUMMARY OF THE INVENTION

A programmable controller includes a processor module and a plurality of input and output (I/O) modules housed in a rack and electrically connected together by a backplane of the rack. The input and output modules interface to sensing and operating devices on machinery operated by the programmable controller. The processor module executes a user defined control program which examines the status of selected sensing devices and sets the states of specified operating devices in accordance with the examined status.

The unique processor module includes a microprocessor, memory and an I/O interface circuit coupled together by a common set of internal signal buses. The I/O interface circuit controls the exchange of data over the rack backplane with the I/O modules. This circuit performs conventional transfer functions for exchanging both single bytes and multiple byte blocks of data with the I/O modules. In addition, the I/O interface circuit is programmable to pre-process input data before it reaches the microprocessor. A predefined input transition can be detected and in response, either interrupt the microprocessor or count the transition, interrupting the microprocessor only after a given number of transitions occur. Upon being interrupted the microprocessor executes a corresponding interrupt routine which responds to the detected input condition.

A general object of the present invention is to provide a programmable controller processor module with an intelligent interface circuit to handle the exchange of data with I/O modules. Such an interface circuit frees the program execution processor from handling I/O module data transfer.

Another object of the present invention is to provide a programmable controller processor module in which the occurrence of defined input transitions can be detected without the intervention of the microprocessor.

A further object is to provide the interface circuit with the capability to preprocess incoming data according to configuration data specified by a user.

DETAILED DESCRIPTION OF THE INVENTION

Figure 1:
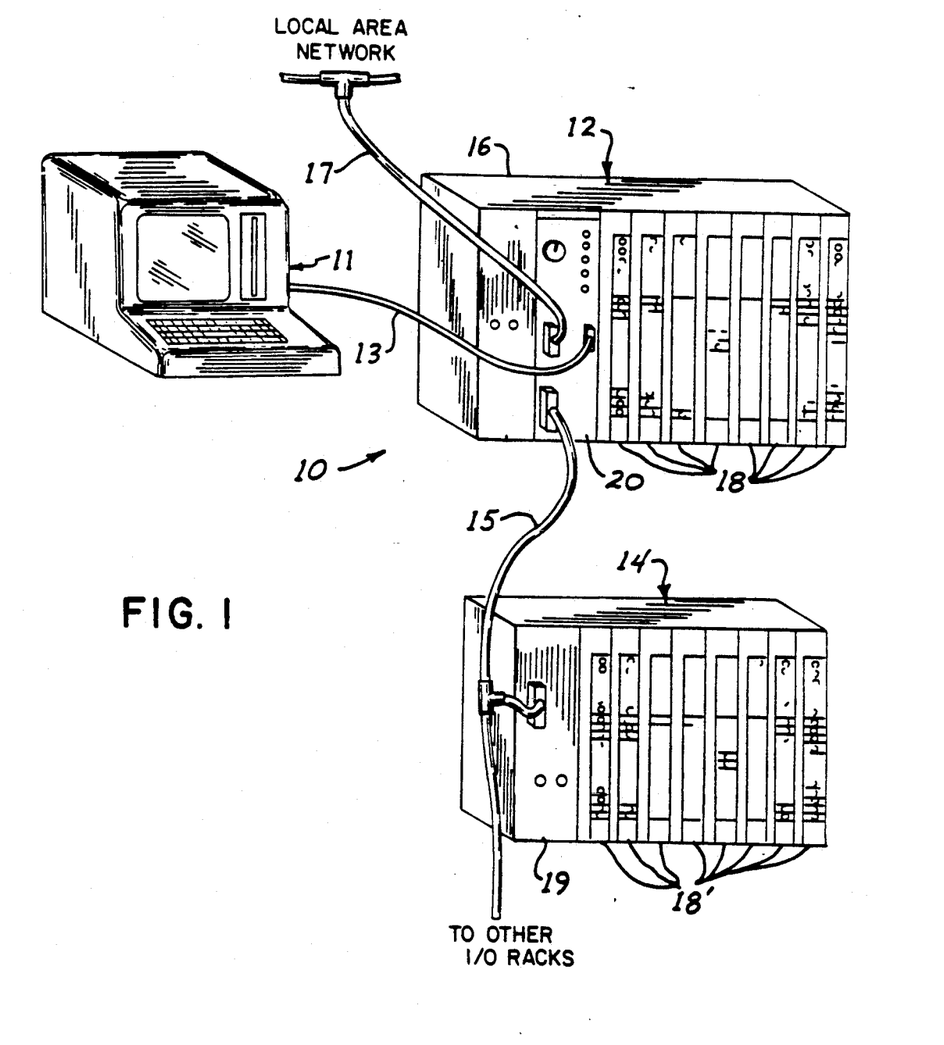
FIG. 1 is a perspective view of a programmable controller system employing the present invention.

Referring to FIG. 1, a programmable controller system generally designated as 10 comprises a primary equipment rack 12 and a series of remote input/output (I/O) racks, such as rack 14, interconnected by a serial I/O network 15.

The primary rack 12 houses a power supply, processor module 20 located in the first, and a plurality of input/output interface modules 18 housed in other slots. The processor module 20 executes a user-defined control program that responds to signals from sensing devices on the controlled equipment (not shown) by issuing signals to actuating devices on the same equipment. The sensing and actuating signals are coupled to the rack 12 through the input/output interface modules 18. The various modules 18 and 20 within the primary rack 12 are electrically interconnected by conductors on a backplane 16 of the rack enabling data, address and control signals to be exchanged among the modules.

The processor module 20 receives program instructions via a terminal 11 that is connected by cable 13 to a serial port connector on the front panel of the module. The I/O network 15 is coupled to another connector on the front panel of the processor module 20 and to an adaptor module 19 in the remote I/O rack 14, enabling the processor module 20 to exchange data with another group of I/O modules 18' within the remote I/O rack. A local area network (LAN) 17 is coupled to a third port connector on the front panel of the processor module 20 enabling the module to communicate with a host computer and other programmable controllers coupled to that network. For example, communication via LAN 17 enables a host computer to direct the operation of a plurality of programmable controllers such as device 10 in order to supervise a complex manufacturing system.

Whereas previous programmable controllers utilized separate modules within the primary rack 12 to perform the program execution, host communication and remote I/O rack communication functions, the present system incorporates all of these functions within the processor module 20. By doing so, the communication between the modules 18 in rack 12 via the rack backplane has been reduced to exchanging data representing the state of the sensing and actuating devices on the control equipment.

Figure 2:
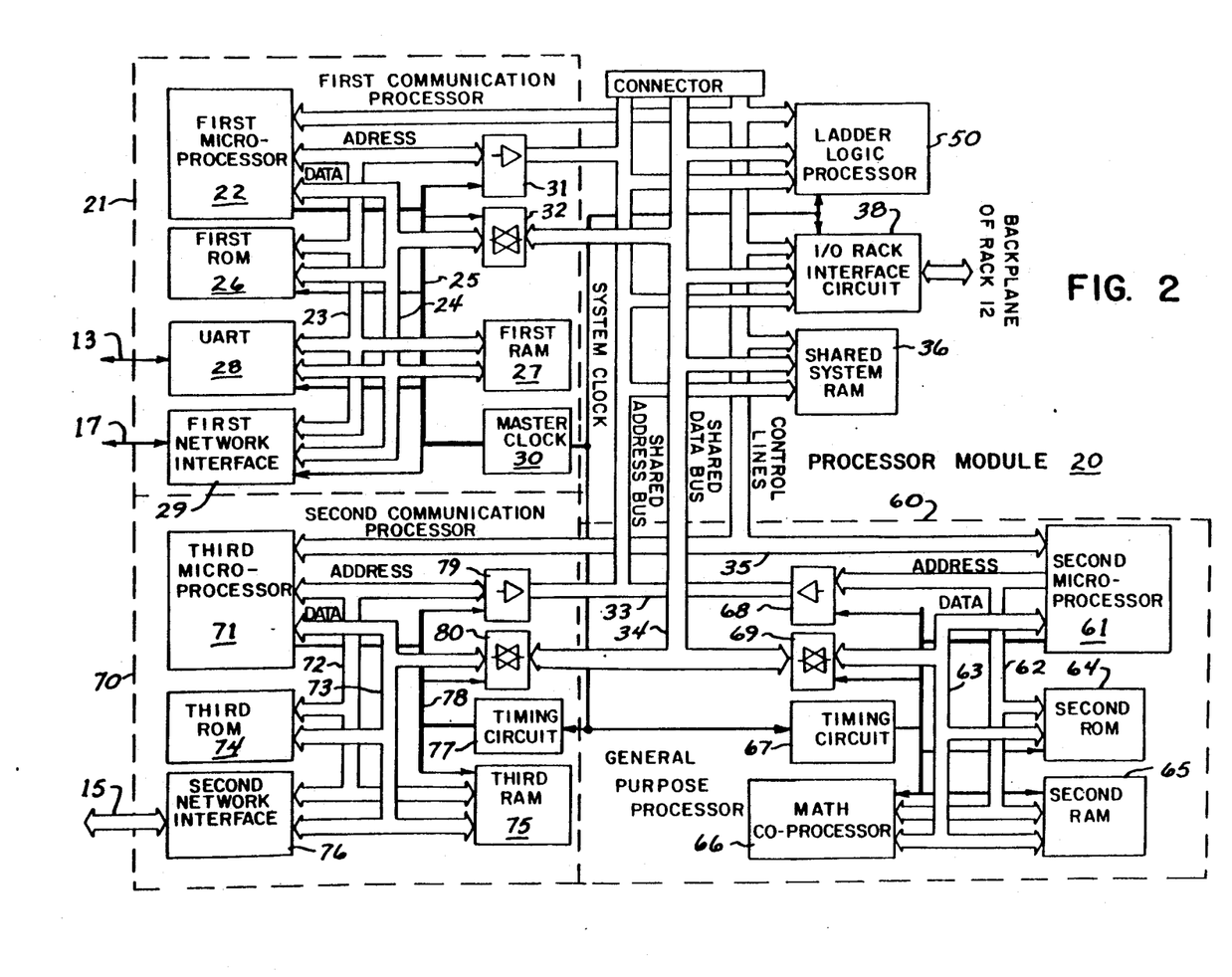
FIG. 2 is a functional block diagram of a processor module which forms part of the controller of FIG. 1.

Referring to FIG. 2, the processor module 20 includes a general purpose processor section 60 for user control program execution and two communication processor sections 21 and 70 to handle the exchange of data over cable 13 and networks 15 and 17. As will be described in detail, each of these sections of the processor module has its own microprocessor and local memory coupled by an isolatable set of address, data and control buses. The processor module 20 also has a set of shared buses 33-35 which connect these sections 21, 60 and 70 together and to other data processing and storage components.

A first communication processor section 21 is formed around a local address bus 23 and a local data bus 24. Coupled to these buses is a first microprocessor 22 which executes a program stored in a first read only memory (ROM) 26 and utilizes a first local random access memory (RAM) 27 as a scratch-pad for temporary data storage. A master clock circuit 30 provides a system clock signal for other components within the processor module 20 as well as providing specific timing signals via control lines 25 to the components of the first communication processor section 21.

The primary function assigned to the first microprocessor 22 in the exemplary processor module is the control of communication with the programming terminal 11 and the LAN 17. A UART 28 couples the local address and data buses 23 and 24 to the terminal via cable 13. The UART 28 is any of several commercially available devices which interface the parallel data format within the processor module 20 to a serial communication format for communicating with the terminal 11. Although the module port from the UART 28 is illustrated as connected to the programming terminal 11, this port can be coupled to other types of serial devices for the exchange of data with the processor module 20. The local address and data buses 23 and 24 are coupled to a first network interface 29 so that the first microprocessor 22 can exchange data over LAN 17 with other devices. The first network interface converts the parallel data within the processor module 20 into a serial formatted message packet which is compatible with the protocol employed to communicate with the devices on LAN 17.

The first communication processor section 21 is connected to other processor module sections through a set of tri-state address gates 31 and a set of bi-directional tri-state data gates 32. Specifically, the set of gates 31 couples the local address bus 23 to the module's shared address bus 33, and the set of data gates 32 couples the local data bus 24 to a shared data bus 34. A set of control lines 35 extend between processor module components and hereinafter is referred to as a control bus.

Figure 3:
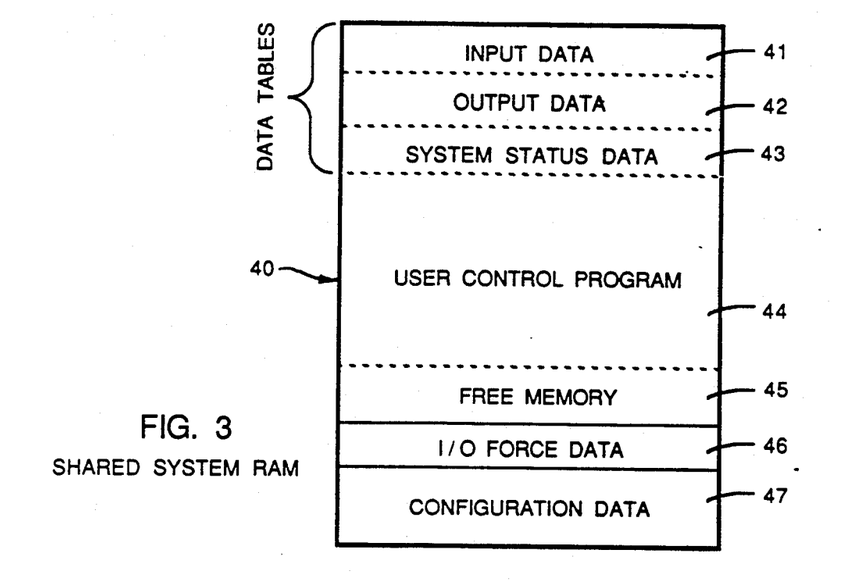
FIG. 3 illustrates the data structures of the shared system memory in the processor module.

This coupling of buses allows the first microprocessor 22 to write and read data to and from a shared system RAM 36 coupled to the shared address and data buses 33 and 34. The organization of data within the shared system RAM 36 is illustrated in FIG. 3. A block of shared system RAM storage locations contains a conventional set of data tables 41-43 for the processor module 20. The first of these data tables 41 stores input data representing the state of the sensing devices coupled to the controlled equipment. Data from input type I/O modules 18 in the primary and remote racks 12 and 14 are stored in an organized manner in this table 41. A second data table 42 stores output data representing the state of the actuating devices on the equipment which are operated by the programmable controller system 10. Using a similar organization, the output table 42 stores the data employed to control the actuating devices connected to output type I/O modules 18 in racks 12 and 14. Another data table 43 contains information regarding the status of the programmable controller 20 and its components. As may be necessary, additional data tables can be stored in the shared system RAM 36.

A block of storage locations 44 in the shared system RAM 36 stores the user-defined control program. Depending upon the specific definition of this program given by the user, this block 44 may store a single ladder logic control program or a series of such programs to be executed in a sequence defined by a conventional function chart. In the latter case, the function chart data files also are stored in memory block 44 along with the ladder logic control programs. Following the storage locations used by the control program is a section of free memory locations 45. Another section of the shared system RAM contains an I/O force data table, similar to that used in previous programmable controllers to force the control data from specific sensing or actuating devices to a given logic state. A section 47 of storage locations at the high addresses of the shared system RAM 36 is used to contain system, processor module, and microprocessor level configuration data. For example, the configuration data defines password and privilege information, port communication parameters and event timeout intervals.

Referring again to FIG. 2, a ladder logic processor 50 is also coupled to the shared address and data buses 33 and 34. The vast majority of ladder control program instructions operate on a single bit or word of data. The ladder logic processor 50 has been designed to execute the subset of ladder diagram instructions which perform these basic control operations. This not only provides efficient execution of frequently occurring instructions, it also frees the microprocessors in the module 20 to carry out other functions simultaneously with the control program execution. The ladder logic processor 50 also arbitrates among competing requests from processor module components for access to the shared buses 33-35 and grants such access based upon a predefined priority.

Certain functions, such as data block transfers to the I/O modules 18 and complex mathematical and logical operations cannot be performed by the ladder logic processor 50. These complex control program functions are executed by the general purpose processor section 60. This section of the processor module 10 contains a second microprocessor 61 connected to its own isolated set of address and data buses 62 and 63, respectively. This pair of buses 62 and 63 couples the second microprocessor 61 to a second ROM 64 and a second local random access memory 65. The second ROM 64 stores the firmware which is executed by the second microprocessor 61 to carry out the more complex ladder logic operations. The firmware in ROM 64 also interprets the function chart when one is defined by the user.

Many of the user control program instructions which the ladder logic processor 50 cannot perform are complex arithmetic operations. Therefore, a conventional math co-processor 66 is provided to execute the corresponding instructions more efficiently than by using the second microprocessor 61. A timing circuit 67 receives the system clock signal and derives therefrom the necessary timing and control signals for the second microprocessor 61, memories 64 and 65, and the math co-processor 66. A pair of tri-state transmission gates 68 and 69 isolate address and data buses 62 and 63, respectively of the general purpose processor section 60 from the shared address and data buses 33 and 34. When these gates 68 and 69 are enabled in response to a command from the second microprocessor 61, the internal set of buses 62 and 63 are electrically connected to shared buses 33 and 34. This enabling occurs only when the second microprocessor 61 requires access to the shared system memory and has been granted access to buses 33 and 34 by an arbitration circuit in the ladder logic processor 50.

As described above, the processor module 20 is coupled via I/O network 15 to one or more remote I/O racks 14. The processor module utilizes a second communication processor section 70 with a third microprocessor 71 to control the gathering of sensor data and the transmission of actuating device state commands to these remote racks. The third microprocessor 71 is coupled to another set of isolated address and data buses 72 and 73 and a set of control lines 78. A third ROM 74 is connected to these buses and stores the firmware which is executed by the third microprocessor 71 to perform its communication function. A third level RAM 75 provides a scratch-pad memory and temporary storage location for the data being communicated over cable 15.

A second network interface 76 translates the parallel data format within the processor module into the serial format and the specific protocol used to communicate the data over the I/O network 15. A timing circuit 77 receives the system clock signal from the master clock circuit 30 to provide the necessary timing signals for the components associated with the third microprocessor 71. These timing signals are transmitted via some of the control lines in set 78.

The address bus 72 coupled to the third microprocessor 71 is connected to the shared address bus 33 by a set of tri-state gates 78. Similarly, the data bus 73 associated with the third microprocessor 71 is coupled to the shared data bus 34 by a set of tri-state, bi-directional gates 80. Both sets of gates 71 and 80 are enabled by signals via control lines 78 from the third microprocessor 71. The gates are enabled when the third microprocessor 71 has been granted access to the shared buses 33 and 34 by the arbitration circuit within the ladder logic processor 50.

Referring still to FIG. 2, an I/O rack interface circuit 38 is connected to the shared address and data buses 33 and 34 and the backplane 16 of primary rack 12. This interface circuit periodically scans the I/O modules 18 in the primary rack to gather input data from the sensors on the controlled machinery and send output data to the actuating devices. This conventional scanning is accomplished in a manner similar to that employed by previous processor modules by sequentially sending control signals to each I/O module. These control signals cause input type modules to send sensor data over the backplane 16 and cause output type modules to store data sent by the processor module. The data exchanged with the I/O modules 18 in the primary rack 12 can be stored in the I/O data tables 41 and 42 of the shared system RAM 36.

Figure 4:
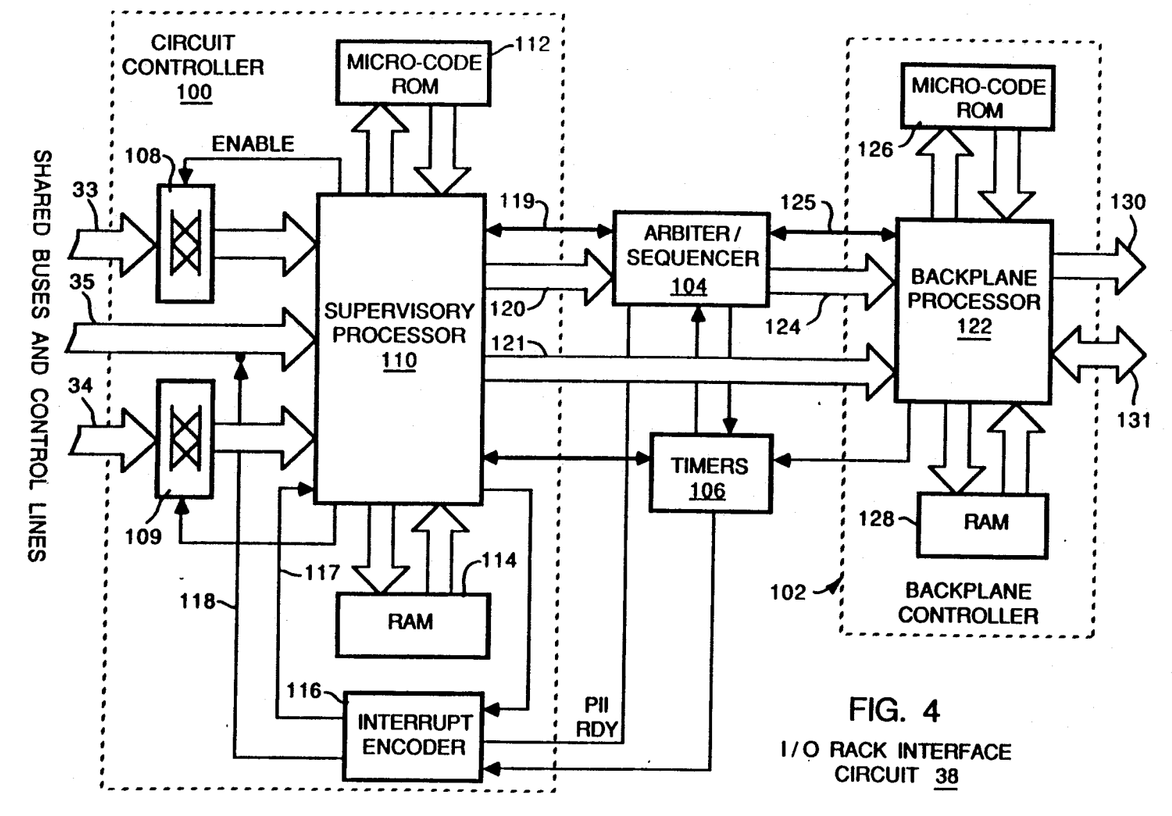
FIG. 4 is a block diagram of the I/O interface circuit in the processor module.

The details of the I/O rack interface circuit 38 are shown in FIG. 4. The I/O rack interface circuit 38 comprises a circuit controller 100, backplane controller 102, an arbiter/sequencer 104 and timer circuits 106. The circuit controller 100 interfaces the I/O rack interface circuit 38 to the shared buses 33-35 of the processor module 20 and provides general supervisory control of the interface circuit operation. To this end, the shared address bus 33 is coupled by a first set of bi-directional data gates 108 to a supervisory processor 110. Similarly, the shared data bus 34 is coupled by a second set of bi-directional data gates 109 to the supervisory processor 110. The control lines of the processor module 20 are connected directly to the supervisory processor.

The supervisory processor 110 executes a micro-code program stored within a first micro-code ROM 112 and stores the results of the processing and data being exchanged over the backplane 16 in a first interface RAM 114. The operation of the supervisory processor 110 will be described subsequently in the course of a description of the operation of the entire I/O rack interface circuit 38.

The circuit controller 100 also contains an interrupt encoder 116 which receives signals from the arbiter/sequencer 104 and the timer circuits 106 indicating the occurrence of various processing events, as will be described. In response to these input signals, the interrupt encoder 116 generates interrupt signals on lines 117 and 118 which respectively interrupt the supervisory processor 110 or other components of the processor module 20 via the set of control lines 35.

The supervisory processor also has a set of control lines 119 and an I/O request bus 120 which are connected to the arbiter/sequencer 104 to control the operation of that latter component. A set of data bus lines 121 extend between the supervisory processor 110 and a backplane processor 122 in the backplane controller section 102. The arbiter/sequencer 104 is also coupled to the backplane processor 122 by address lines 124 and a set of control lines 125.

The timer circuit 106 is coupled by several lines to the arbiter/sequencer 104, the supervisory processor 110 and the interrupt encoder 116. The backplane processor 122 also produces control signals which are coupled to the timer circuit 106.

The backplane controller section 102 consists of not only the backplane processor 122, but also a second micro-code ROM 126 which stores a micro-code program for execution by the backplane processor. A second interface RAM 128 is contained within the backplane controller for storing processing results and data for the backplane processor 122. Additional ports of the backplane processor 122 are connected to a set of control lines and a data bus 131 of the backplane 16 in rack 12. As will be described, the backplane controller section 102 generates control signals to regulate the transfer of data between the processor module 20 and the backplane 16 and can perform rudimentary processing of the input data received from functional modules 18.

The I/O rack interface circuit 38 supervises the exchange of data across the backplane of rack 12. This includes standard discrete (one word) and data block (multiple word) transfers and several priority levels of each type of transfer. The technique by which blocks of data are transferred is described in U.S. Pat. No. 4,293,924. The I/O rack interface circuit handles the following types of I/O requests from other processor module components in the following descending priority order:
  Block Transfer Timeout
  Programmable Input Interrupt (PII)
  Priority immediate I/O
  Priority Block Transfer
  Discrete I/O Scan
  Normal Immediate I/O
  Normal Block Transfer
The first type of I/O request occurs upon the expiration of internal timers in circuit 106 that were set by the user control program. The programmable input interrupt (PII) will be described in detail subsequently. The discrete I/O scan is a conventional exchange of data between all of the modules in the primary rack 12 and the I/O image tables in blocks 41 and 42 of the shared system RAM 36. This exchange typically occurs just prior to each execution pass through the user-defined control program. The priority and normal immediate I/O requests are similar to well-known processes in which a single word of data is transferred over the backplane in response to an instruction in the user defined control program.

Depending upon the number of inputs or outputs in the module to or from which the data is to be transferred, each type of I/O request may require the rack interface circuit 38 to perform several backplane signal cycles. For example, each slot of rack 12 may contain a single density module with only eight I/O points or a double density module with sixteen I/O points. Quad and octal density modules can be used which provide 32 and 64 I/O points respectively. Since data is transferred over the rack backplane in byte sized amounts, multiple transfers are required for higher density modules. Transfer techniques for higher density modules are described in U.S. Pat. No. 4,691,296. For data exchange purposes, the rack slots are grouped in pairs, with one slot of the pair designated as a high slot and the other as a low slot, and both slots being collectively referred to as a "group".

Thus, the seven I/O requests listed above are carried out by selected ones of eighteen different backplane signal cycles by the rack interface circuit 38. These cycles are:
  null
  I/O read low slot
  I/O read high slot
  I/O write low slot
  I/O write high slot
  block transfer write Module Control Byte
  block transfer read Module Status Byte
  block transfer read low slot
  block transfer read high slot
  block transfer write low slot
  block transfer write high slot
  block transfer read checksum
  block transfer write checksum
  PII read low slot
  PII read high slot
  wait
  load diagnostic
  read diagnostic
A null cycle is executed when a backplane signal cycle is not requested and a wait cycle is executed if the previous cycle has not completed. Control data is sent to a module via the block transfer write module control byte cycle and its status obtained with the block transfer read module status byte. The two diagnostic cycles are used at power-up to test the backplane controller 38. The PII cycles will be described subsequently and the functions of the remaining cycles are obvious from their names.

The operation of the I/O rack interface circuit 38 may be better understood through a description of how a discrete data transfer occurs at power-up after diagnostic routines are run. During system initialization, the general purpose processor 60 loads configuration data into the section of data block 47 of share RAM 36 that is assigned to the I/O rack interface circuit. One group of this data identifies the type and size of the primary rack 12 and the density of the module in each rack slot. This configuration data is used by the circuit 38 in determining how to send and receive data over the backplane 16.

When the general purpose processor 60 desires to send or receive data to or from a module in the primary rack 12, it sends the appropriate request to the I/O rack interface circuit 38. This I/O request specifies the type of module access (discrete, block transfer, priority level, etc.) and the slot in which the module is located. The I/O request is sent over the shared buses 33-35 in the processor module 20. The I/O rack interface circuit 38 recognizes that control signals on bus 35 indicate that a primary rack I/O request is being sent, and the circuit controller 100 receives and stores the command.

Upon receipt of the I/O request, the supervisory processor 110 in the circuit controller 100 of FIG. 4 begins executing a firmware routine that is read from the first micro-code ROM 112 to process the command. At this point, the circuit controller's function is to translate the I/O request into a format that the arbiter/sequencer 104 can manipulate. The formatted I/O request is sent by the supervisory processor 110 to the arbiter/sequencer 104 via the I/O request bus 120 along with control signals on line 119. Upon receipt, the I/O request is stored in a request register in the arbiter/sequencer along with other I/O requests awaiting handling.

When the the backplane controller 102 is available, arbiter/sequencer 104 scans the request register for the I/O request with the highest priority. If several I/O requests at the same priority exist, they will be handled in rack slot order going away from the processor module 20 in a rotating round robin arbitration scheme. The arbiter/sequencer 104 is essentially a state machine which takes the I/O request of the highest priority and sends the proper control signals to the backplane controller 102. For example, if the I/O request is to perform an immediate input from a given module in the low slot of a group, the arbiter/sequencer 104 will request the backplane controller to execute a number I/O read low slot cycles depending upon the density of the module, i.e. how many bytes of input data it provides. The density of the module is indicated by configuration data stored in the section 47 of the shared system RAM 36.

When the backplane controller 102 receives a backplane signal cycle execution request from the arbiter/sequencer 104, the backplane processor 122 decodes the cycle designation to address the routine in second micro-code ROM 126 that performs that backplane cycle. In the course of executing this micro-code routine, the backplane processor 122 responds to the instructions by applying the properly timed sequence of control signals to the backplane 16 of the primary rack 12. If the requested I/O function is a block transfer type, the word of data being exchanged, a checksum and a module control byte will be stored temporarily in the RAM 128 of the backplane controller 102. Otherwise, the bytes of data being exchanged is transferred directly between the functional module and a register in the circuit controller 100 via data bus 121. If the I/O request is an input type, once the data has been stored in the interface circuit 38, the supervisory processor 110 requests access to the shared buses 33-35 of the processor module 20. Once that bus access has been granted the supervisory processor 110 transfers the data either to the shared system RAM 36 or the requesting processor section 21, 60 or 70 depending upon the type of request.

One of the unique features of the I/O rack interface circuit 38 is the ability to perform rudimentary preprocessing on defined input signals from the rack modules without intervention by a processor section. This function is referred to herein as a programmable input interrupt (PII). The PII feature enables the user to define a pattern of one or more input bit level transitions for the interface circuit 38 to detect. Further, the circuit can be programmed to interrupt the second micro-processor 61 either after every occurrence of the designated transition pattern or only after a given number of such transitions has occurred.

Figure 5:
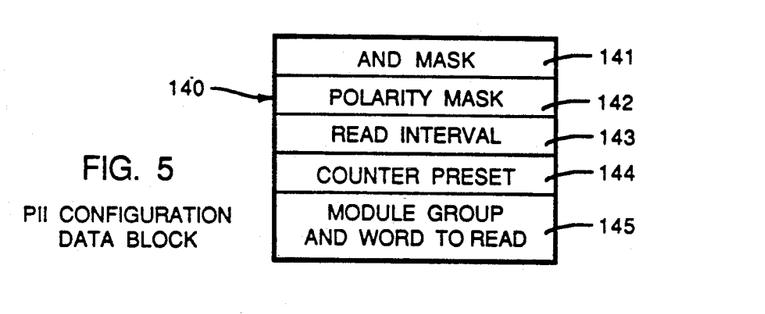
FIG. 5 depicts a block of storage locations in a shared memory of the processor module to store configuration data for a programmable input interrupt function.

The PII function is enabled and configured by data that is stored in section 47 of the shared system RAM 36. A flag bit in the general configuration data for the I/O rack interface circuit 38 is set to enable the PII function. If this function is enabled, the general configuration data also contains a pointer to a configuration data block 140 for the PII function. This data block 140 is depicted in FIG. 5 and consists of five data words. The first word 141 is a mask which is to be ANDed with input data word to select the bits to be tested for a transition. Each bit of this mask is set to a high logic level if the corresponding bit of the input data word is to be tested for a transition. The second PII configuration word 142 is a polarity mask in which specifies the direction of the transition to be detected. In this polarity mask, a high bit designates that a low to high transition of the corresponding input bit is to be detected, whereas a low bit designates the desired detection of a high to low transition. The third word 143 of the PII configuration data block defines the interval, in terms of backplane clock cycles, that is to elapse between reading the input data from the primary rack 12. The number of the designated transitions which must occur before the PII function produces an output is defined by the fourth configuration data word 144. Setting this word to one produces an output, such as an interrupt of the general purpose processor 60, upon every occurrence of the defined transition. The fifth word 145 specifies from which module in the primary rack 12 to obtain the word of input data to examine. If quad density modules are placed in the primary rack, two words of input data are produced by each group of modules. Which one of these words is to be used also is designated by the final entry 145 of PII configuration data block 140.

The purpose and usage of the configuration data is easily understood by explaining the processing of an exemplary word of input data. Initially, when the PII function is enabled, the enable flag is detected by the circuit controller 100 shown in FIG. 4. In response the circuit controller transfers the PII configuration data from the data block in the shared system RAM 36 into registers of the backplane processor 122. One of the timer circuits 106 is initialized with the read interval from configuration block 143. When the read interval elapses, the timer signals the arbiter/sequencer 104 which in turn signals the backplane controller 102 to commence executing the routine in the second microcode ROM 126 that performs the PII function.

Figure 6:
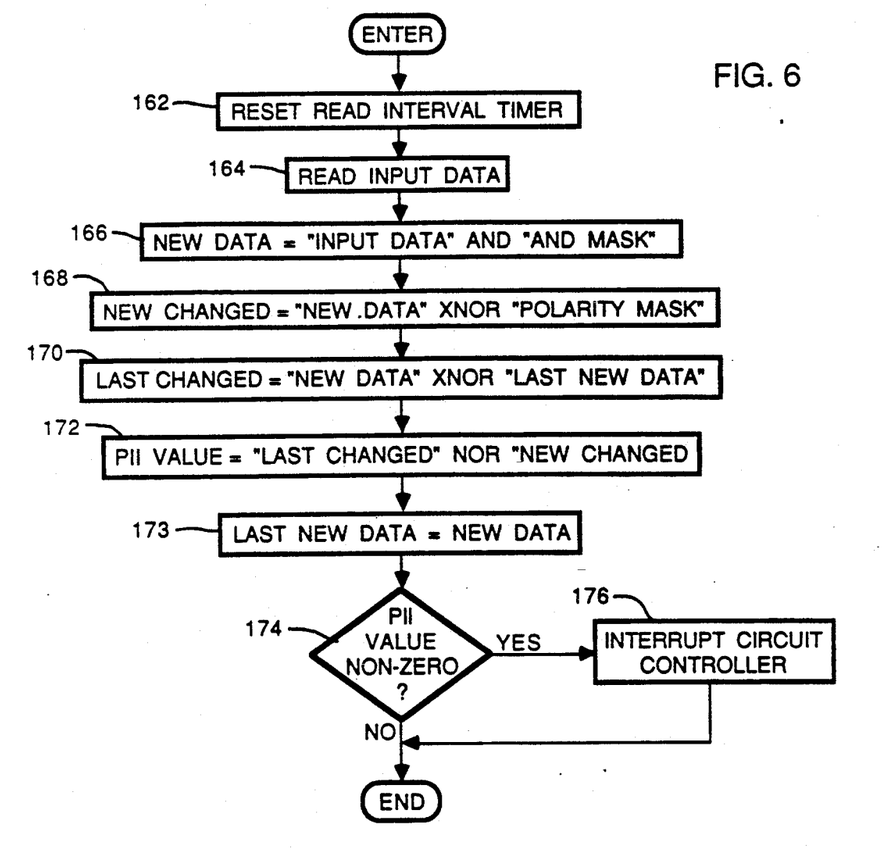
FIG. 6 is a flow chart of one portion of the programmable input interrupt function.
Figure 7:
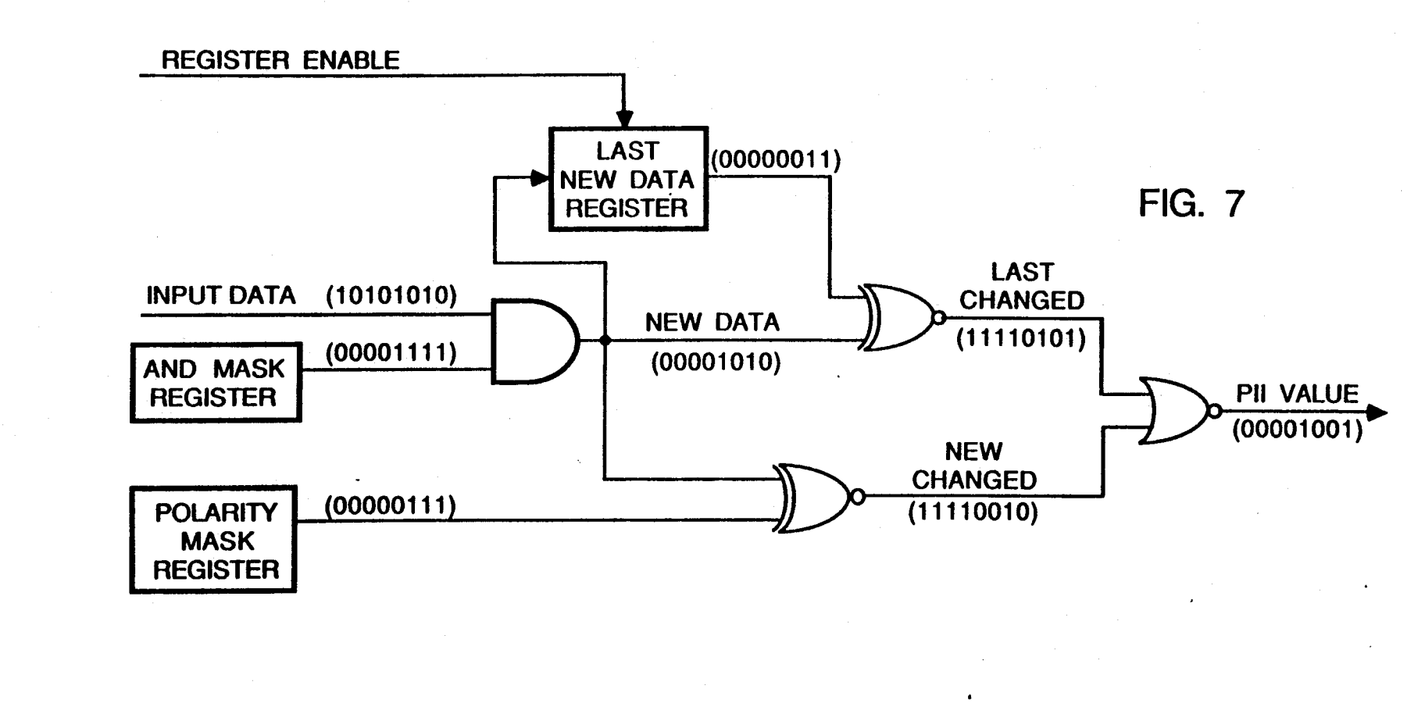
FIG. 7 is a schematic representation of the equivalent hardware for performing the function depicted by the flowchart of FIG. 6

The PII routine stored in ROM 126 is depicted by the flowchart of FIG. 6. Although the PII function is carried out by firmware, the logic operations are schematically illustrated by the hardware in FIG. 7, in which each register, conductor and logic gate is sixteen bits wide to operate on a full word of data. Although the PII function operates on a word of data, the description will be simplified by considering only a byte of data.

The PII routine commences at step 162 where the timer is reset to the read interval before advancing to step 164. Then, the backplane processor 122 sequences through a backplane signal cycle to acquire the word of input data to examine at step 164. In doing so, the backplane processor reads the input data from the slots of the primary rack 12 that are designated by the word configuration data 145 stored in the shared system RAM 36. For example, assume that the input data is 10101010. Once acquired, the input data is filtered by the AND MASK stored as configuration word 141 in the shared system RAM 36. If only the last four bits are of concern, the AND MASK in the first configuration data block word will be 00001111. The AND MASK is logically ANDed at step 166 with the input data to produce a value for a variable designated NEW DATA, which in the case of the example will be 00001010. Thus, the four most significant bits have been zeroed by the masking process.

The value of NEW DATA then is used to derive two other intermediate variables used in the PII function. The first of these is designated NEW CHANGED and is the result of exclusive NORing the variable NEW DATA with the polarity mask stored in configuration word 142. For example, the polarity mask may be 00000111 indicating that a low to high transition is expected for the three least significant bits and a high to low for the remaining bits. In the current example, this logical operation produces a 11110010 value for the NEW CHANGED variable at step 168. The second intermediate variable, designated LAST CHANGED, is produced at step 170 by exclusive NORing the value of NEW DATA with the value of the variable NEW DATA from the previous input cycle to determine which bits have changed. This previous value is stored as the variable designated LAST NEW DATA. If LAST NEW DATA is 00000011 in the example, LAST CHANGED has a value of 11110110 in which the zeroes indicate bits that have made a transition.

The final logical operation of the PII function involves NORing the variables LAST CHANGED and NEW CHANGED to produce a result designated PII VALUE at step 172. For the current example, the PII VALUE is 00001001 the ones of which indicate bits that have undergone the transition specified by the configuration data. In the example, the least significant bit made the desired low to high transition and the fourth bit made the desired high to low transition. Thus, these bit positions in the PII VALUE contain ones. Even though the second and third bits in the input data underwent transitions, they were opposite to the desired direction and hence those bit positions in the PII VALUE are zeroes.

Whenever at least one of the defined bits makes the specified transition, PII VALUE will be non-zero. When this occurs as determined at step 174, the backplane processor 122 signals arbiter/sequencer 104 which in response causes the interrupt encoder 116 to interrupt the supervisory processor 110 at step 176. Otherwise, if a specified bit transition did not occur, the program execution terminates until the PII read interval timer times out again.

Figure 8:
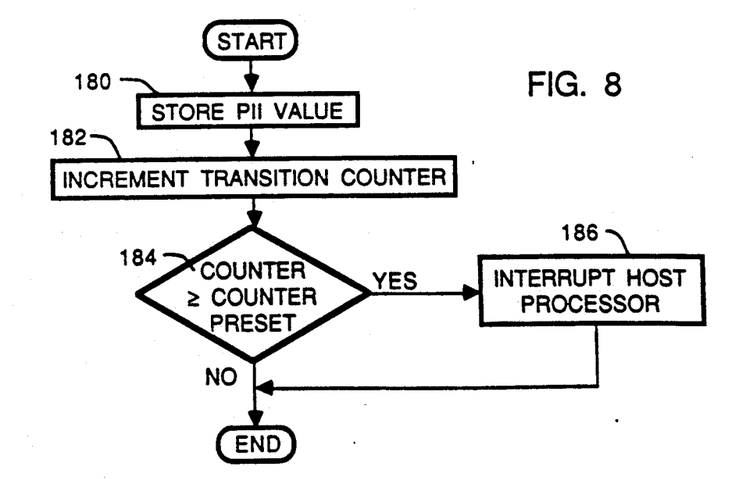
FIG. 8 is a flowchart of another portion of the programmable input interrupt function.

Upon being interrupted in this manner, the supervisory processor 110 executes an interrupt routine depicted by the flowchart of FIG. 8. At the outset the supervisory processor obtains the PII VALUE and stores it in RAM 114 of the circuit controller 100 at step 180. The supervisory processor 110 also increments an internal counter and compares the counter value to the counter preset word 144 from entry 144 of the PII configuration data block 140. If these two values are equal, it is time to interrupt the second microprocessor 61 on FIG. 2 which is done at step 186.

Figure 9:
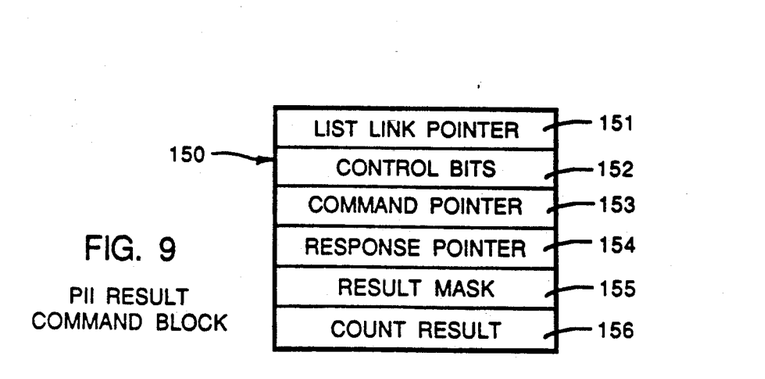
FIG. 9 is a data block containing the results of the programmable input interrupt function.

At the same time, the supervisory processor 110 places a command block of data 150 as depicted in FIG. 9 in the interrupt queue of the general purpose processor 60. This command block contains the data necessary for the second microprocessor 61 to handle the PII interrupt. The first entry 151 in the command block 150 is a pointer to the next command block in the queue and has a zero value if it is the last command block of the queue. When a new command block is added to the queue, the list link pointer of the previous last block in the queue is changed to point to the newly added command block. The second entry 152 of a control block 150 is a control word, the bits of which indicate the completion of the PII function and whether an error has occurred. The third word 153 is a command pointer that indicates the block is for the PII function as opposed to other operations for the second microprocessor 61, while the fourth word 154 indicates the type of response to be taken upon the PII completion. This response designates whether the second microprocessor 61 is to be interrupted or whether the command block is merely to be placed in a queue of tasks for the microprocessor to perform. The fifth word 155 is the PII VALUE indicating which input bits made the defined transition and the final entry 156 is the value of the transition counter when the PII function completed. These latter two fields can be used by the second microprocessor 61 in determining the precise response to take to the PII function.

When the second microprocessor handles the PII interrupt, it executes a user defined routine designated to handle that interrupt and process the results of the PII function. This interrupt handling routine inspects the bits of PII VALUE and decides what, if any, action needs to be taken in response to the designated input bit transitions.

We claim:

1. In a programmable controller having a plurality of input and output modules that interface electrical signals with sensing and actuating devices on machinery operated by the programmable controller, and a set of data and control signal buses to which the input and output modules are coupled;

a processor module comprising:
    a first memory means for storing data representing status of the sensing and actuating devices;
    a second memory means for storing a control program that operates on the data stored in said first memory means to control the machinery;
    a processor for executing the control program;
    a group of internal buses to which said first and second memory means and said processor are electrically connected for the exchange of data, address and control signals; and
an I/O interface coupled to said group of internal buses and to the set of data and control signal buses and including:
    a) means for exchanging data with said input and output modules over the set of data and control signal buses;
    b) means for defining a set of a plurality of expected transitions in data from the input modules;
    c) means for detecting when the expected transitions occur and providing an indication of that occurrence; and
    d) means for signalling said processor when said means for detecting provides the indication.

2. The process module as recited in claim 1 wherein said means for detecting provides the indication when any one of the plurality of expected transitions in the defined set occurs.

3. The processor module as recited in claim 2 wherein said means for signalling provides an indication to said processor of which transitions in the defined set of a plurality of expected transitions occurred.

4. The processor module as recited in claim 1 wherein said means for detecting provides the indication only after a given number of expected transitions has occurred.

5. The processor module as recited in claim 4 wherein said means for defining a set of a plurality of expected transitions comprises a means for indicating the given number of expected transitions.

6. The processor module as recited in claim 1 wherein said means for defining a set of a plurality of expected transitions comprises:
   means for storing a mask that identifies which bits in the data from a predefined input module are to be tested for a transition; and
   means for storing an indication of a transition direction for each of the bits identified by the mask.

7. The processor module as recited in claim 6 wherein said means for exchanging data periodically reads data from the predefined input module at user definable intervals of time.

8. The processor module as recited in claim 1 wherein said means for exchanging data periodically exchanges data with the input modules at user definable intervals of time.

9. The processor module as recited in claim 1 wherein said means for exchanging data includes means for transferring multiple byte blocks of data over the set of data and control signal buses.

10. A programmable controller having a rack with a set of signal busses, a plurality of removable input and output modules coupled to the set of signal busses and coupled to sensing and actuating devices on machinery controlled by the programmable controller, and a processor module; said processor module comprising:
   a system memory means for storing a ladder logic control program for operating the machinery, and for storing data representing the status of the sensing and actuating devices;
   a ladder logic instruction processor which executes a defined set of instructions that form the ladder logic control program;
   a processor section for executing instructions of the ladder logic control programs which can not be executed by said ladder logic processor;
   internal module buses coupling said system memory, said ladder logic processor and said processor section for transmission of data and control signals therebetween; and
   a rack interface coupled to said internal module buses and coupled to the set of signal busses, and including:
   a) means for exchanging data with said input and output modules over the set of data and control signal buses in response to control signals from said processor section;
   b) means for storing configuration information defining a set of expected bit transitions;
   c) means for detecting when the defined set of expected bit transitions occurs in data read from a designated input module, and providing an indication of that occurrence; and
   d) means for signalling said processor section when said means for detecting provides the indication.

11. The programmable controller as recited in claim 10 wherein said means for storing configuration information comprises:
   means for storing an identification of the designated input module;
   means for storing a mask that identifies which bits in the data read from the designated input module are to be tested for a transition; and
   means for storing an indication of a transition direction for each of the bits identified by said means for storing a mask.

12. The programmable controller as recited in claim 11 wherein said means for storing configuration information further comprises means for storing a definition of how many defined transitions must occur before said processor section is signalled by said means for signalling.

13. The programmable controller as recited in claim 10 wherein said rack interface further includes a timer coupled to said means for exchanging data to enable the reading of data from the designated input module at given intervals of time.

14. The programmable controller as recited in claim 13 wherein said means for storing configuration information comprises means for storing a definition of a duration for the given intervals of time.

15. The programmable controller as recited in claim 10 wherein said means for detecting provides the indication when at least one of the transitions in the defined set of expected bit transitions occurs in data from a designated input module.

16. The programmable controller as recited in claim 10 wherein said means for signalling said processor provides information to said processor as to which transitions in the defined set of expected bit transitions occurred.

17. The programmable controller as recited in claim 10 wherein said means for detecting provides the indication only after a given number of the defined set of expected bit transitions has occurred.

18. The programmable controller as recited in claim 10 wherein said means for exchanging data includes means for transferring multiple byte blocks of data over the set of data and control signal buses.

19. The programmable controller as recited in claim 10 wherein said processor further comprises a communication circuit coupled to the internal buses for exchanging messages over a communication link with an external device.

20. In a programmable controller having a plurality of input and output modules that interface electrical signals with sensing and actuating devices on machinery operated by the programmable controller, and a set of data and control signal buses to which the input and output modules are coupled; a processor comprising:
   means for exchanging data with said input and output modules over the set of data and control signal buses;
   means for storing a selection mask that identifies which bits in the data from a predefined input module are to be tested for a transition;
   means for storing a polarity mask that identifies a transition direction for each of the bits identified by the selection mask;
   means for performing logical operations on data read from an input module to detect an occurrence of transitions defined by the selection mask and the polarity mask.

21. The processor module as recited in claim 20 wherein said means for exchanging data periodically reads data from the predefined input module at user definable intervals of time.

22. The processor module as recited in claim 20 further comprising means for producing a signal after a given number of detected occurrences.

* * * * *